United States Patent
Friedrich (10) Patent No.: US 6,452,715 B1
(45) Date of Patent: Sep. 17, 2002

(54) METHOD AND APPARATUS FOR DETERMINING A FIBER PLANT GAIN TRANSFER FUNCTION AND UTILIZING SAME TO CONTROL DISTRIBUTED GAIN

(75) Inventor: Lars Friedrich, Glen Burnie, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/650,508

(22) Filed: Aug. 29, 2000

(51) Int. Cl.[7] .................. H04B 10/08; H04B 10/12; H01S 3/30
(52) U.S. Cl. .................. 359/334; 359/110; 359/341.42
(58) Field of Search .............. 359/337, 337.1, 359/337.11, 341.41, 341.42, 334; 372/110, 29.011, 29.014

(56) References Cited

U.S. PATENT DOCUMENTS

| | | | |
|---|---|---|---|
| 5,039,199 A | | 8/1991 | Mollenauer, et al. ........ 359/334 |
| 5,225,922 A | | 7/1993 | Chraplyvy et al. .......... 359/124 |
| 5,335,109 A | * | 8/1994 | Heidemann ................. 359/177 |
| 5,406,404 A | | 4/1995 | DiGiovanni et al. ........ 359/161 |
| 5,818,629 A | * | 10/1998 | Kinoshita ................... 359/341 |
| 5,847,862 A | | 12/1998 | Chraplyvy et al. ......... 359/164 |
| 5,883,736 A | | 3/1999 | Oshima et al. ............. 359/341 |
| 5,887,093 A | * | 3/1999 | Hansen et al. .............. 359/160 |
| 5,907,429 A | * | 5/1999 | Sugata ....................... 359/341 |
| 5,959,750 A | * | 9/1999 | Eskildsen et al. ........... 359/134 |
| 5,959,766 A | | 9/1999 | Otterbach et al. .......... 359/337 |
| 6,016,219 A | * | 1/2000 | Fatehi et al. ................ 359/117 |
| 6,038,356 A | | 3/2000 | Kerfoot, III et al. ......... 385/24 |
| 6,040,933 A | | 3/2000 | Khaleghi et al. ........... 359/124 |
| 6,052,219 A | | 4/2000 | Kidorf et al. ............... 359/334 |
| 6,088,152 A | | 7/2000 | Berger et al. ............... 359/334 |
| 6,115,174 A | | 9/2000 | Grubb et al. ............... 359/334 |
| 6,239,903 B1 | * | 5/2001 | Islam et al. ................. 359/160 |
| 6,344,925 B1 | * | 2/2002 | Grubb et al. ............... 359/341.3 |
| 6,356,386 B1 | * | 3/2002 | Denkin et al. .............. 359/124 |
| 6,366,729 B1 | * | 4/2002 | Brandon et al. ............. 372/3 |

FOREIGN PATENT DOCUMENTS

EP      0859435      8/1998      ............. H01S/3/06

OTHER PUBLICATIONS

Koch, F. et al., "Broadband gain flattened Raman Amplifier to to extend operation into the third telecommunication window." Optical Fiber Communication Conference, vol. 4, pp. 103–105.*

(List continued on next page.)

Primary Examiner—Thomas H. Tarcza
Assistant Examiner—Andrew R. Sommer
(74) Attorney, Agent, or Firm—Michael R. Cammarata (57) ABSTRACT

Systems and methods for determining the distributed gain properties of a fiber plant are disclosed. A detector, a controller and a memory device are utilized to measure signal levels while the pump power is increased. The controller calculates gain for various pump power levels to construct a gain profile or transfer function which may be, for example, gain as a function of pump power. A gain transfer function is constructed for the particular fiber plant to which optical pump is connected. The constructed gain transfer function relates the output power of the optical pump and the signal gain of the signal travelling in the fiber plant. A controller utilizes the constructed gain transfer function to control the output power of the optical pump to produce a desired amount of signal gain. The gain transfer function may be stored as a look-up table and accessed by the controller to determine the amount of output power corresponding to a desired gain level. By utilizing these techniques the differing gain properties of different fiber plants can be compensated such that a desired gain level is achieved.

21 Claims, 6 Drawing Sheets

OTHER PUBLICATIONS

Krol, M.F. et al. "Dual Cavity Optical Automatic Gain Control for EDFAs."Optcal Fiber Communication Conference, 1999, and the IFC/IOOC, Technical Digest, pp. 214–216, vol. 2.*

Academic Press Dictionary for Science and Technology, "calibration," www.hardcourt.com/dictionary/.*

A. M. Hill, et al., "Nonlinear Crosstalk Due to Stimulated Raman Scattering in a Two–Channel Wavelength–Division–Multiplexed System", Electronics Letters, vol. 20, No. 6, 1984.

PCT, "Notification of Transmittal of the International Search Report or the Declaration".

* cited by examiner

METHOD AND APPARATUS FOR DETERMINING A FIBER PLANT GAIN TRANSFER FUNCTION AND UTILIZING SAME TO CONTROL DISTRIBUTED GAIN

FIELD OF THE INVENTION

The invention generally relates to control systems and methods for optical amplifiers. More specifically, the invention relates to systems and methods that control the gain provided to a signal travelling in a fiber plant.

BACKGROUND OF THE INVENTION

Many types of optical amplifiers exist in the optical telecommunications field. A dominant player is the EDFA (erbium doped fiber amplifier). As is well known, an EDFA utilizes a doped section of fiber that is pumped by one or more optical pumps. Because the properties of the doped fiber section are well known and because the amplification occurs in the doped fiber section, the gain properties of a given EDFA are easily controlled to produce a desired gain.

Another type of optical amplifier is the distributed amplifier. Examples of distributed amplifiers include Raman and Brillouin amplifiers. As is also well known, distributed amplifiers perform distributed amplification over a relatively long segment of fiber. For example, a typical Raman amplifier may distribute amplification over 20km of fiber.

The optical fiber used by such distributed amplifiers to amplify the signal is typically the existing optical fiber to which the optical pumps are connected. Distributed amplifiers depend upon the existing fiber plant as the amplification medium in which the amplification occurs. In other words, the amplification medium is not part of the amplifier itself, i.e. not engineered by the amplifier manufacturer.

Existing fiber plants vary widely in their respective properties. Specifically, the gain properties are not constant from one fiber plant to the next fiber plant. The amount of gain produced by a distributed amplifier will change because the amount of gain of a distributed amplifier varies as a function of the fiber plant gain properties.

More specifically, the distributed gain properties such as the Raman gain properties of the fiber plant are, among others, dependent on the fiber type (NDSF, NZDSF such as Coming LS, LEAF, Lucent Truewave® Classic, RS, Plus, DSF etc.), the loss of the fiber (dependent on aging, fiber type), discrete losses such as splices, connectors, patch panels, etc. These parameters may vary considerably from fiber plant to fiber plant.

Thus, a need exists for detecting these parameters so that a distributed amplifier such as a Raman amplifier and thus the optical transmission system will work at the desired gain level.

SUMMARY OF THE INVENTION

In general, the invention includes systems and methods for determining the distributed gain properties of a fiber plant and controlling an optical pump according to the determined gain properties. By applying the inventive techniques, the gain of a distributed amplifier system using a particular fiber plant can be precisely controlled to produce a desired gain value.

The inventive apparatus includes a detector, a controller and a memory device. The detector measures signal levels at various pump power levels. The controller calculates gain for various pump power levels to construct a gain profile or transfer function which may be, for example, gain as a function of pump power. The controller may store the gain profile in the form of a look-up table in the memory device.

By accessing the look-up table stored in memory device or by utilizing a calculated transfer function, the controller can determine the output power corresponding to a desired amount of gain. The controller can then control the optical pump to provide this output power and thereby produce the desired amount of gain for the signal.

The invention may be applied to single wavelength or multi-wavelength systems. In a multi-wavelength system such as a wavelength division multiplexed system, the invention may also include a filter that is used to filter out wavelengths outside the operating range. The filter may be used in conjunction with gain calculation that sums the gain for all of the channels or wavelengths of the system. Other types of gain calculations may also be used by the invention to determine an appropriate gain transfer function for the fiber plant.

In particular, the inventive methods may include providing distributed amplification having a desired gain for a signal travelling in a fiber plant, including increasing an output power of an optical pump operatively connected to the fiber plant and operable at a wavelength selected to provide distributed gain to the signal travelling in the fiber plant; measuring a signal level of the signal travelling in the fiber plant at an increased output power of the optical pump increased by the increasing step; calculating a function relating the output power of the optical pump and the signal gain of the signal travelling in the fiber plant; storing the function calculated by the calculating step relating the output power of the optical pump and the signal gain of the signal travelling in the fiber plant; and controlling the output power of the optical pump according to the stored function to provide the desired gain.

Furthermore, the inventive apparatus may control an optical pump to provide a desired gain for a signal travelling in a fiber plant, and including a detector operatively connected to the fiber plant, a controller operatively connected to the detector and to the optical pump; a memory device operatively connected to the controller; the controller controlling the optical pump to increase output power of pumping light injected into the fiber plant; the detector detecting a signal level of the signal travelling in the fiber plant at an increased output power of the optical pump increased by the controller; the controller receiving the signal level from the detector; the controller constructing a transfer function relating the output power of the optical pump and a signal gain of the signal travelling in the fiber plant; and the controller controlling the output power of the optical pump according to the transfer function to provide the desired gain.

The inventive techniques may be applied whenever a distributed amplifier, such as a Raman amplifier, is installed. Alternatively, a calibration switch or other command signal input can be utilized to trigger the inventive methodologies.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Figure 1:
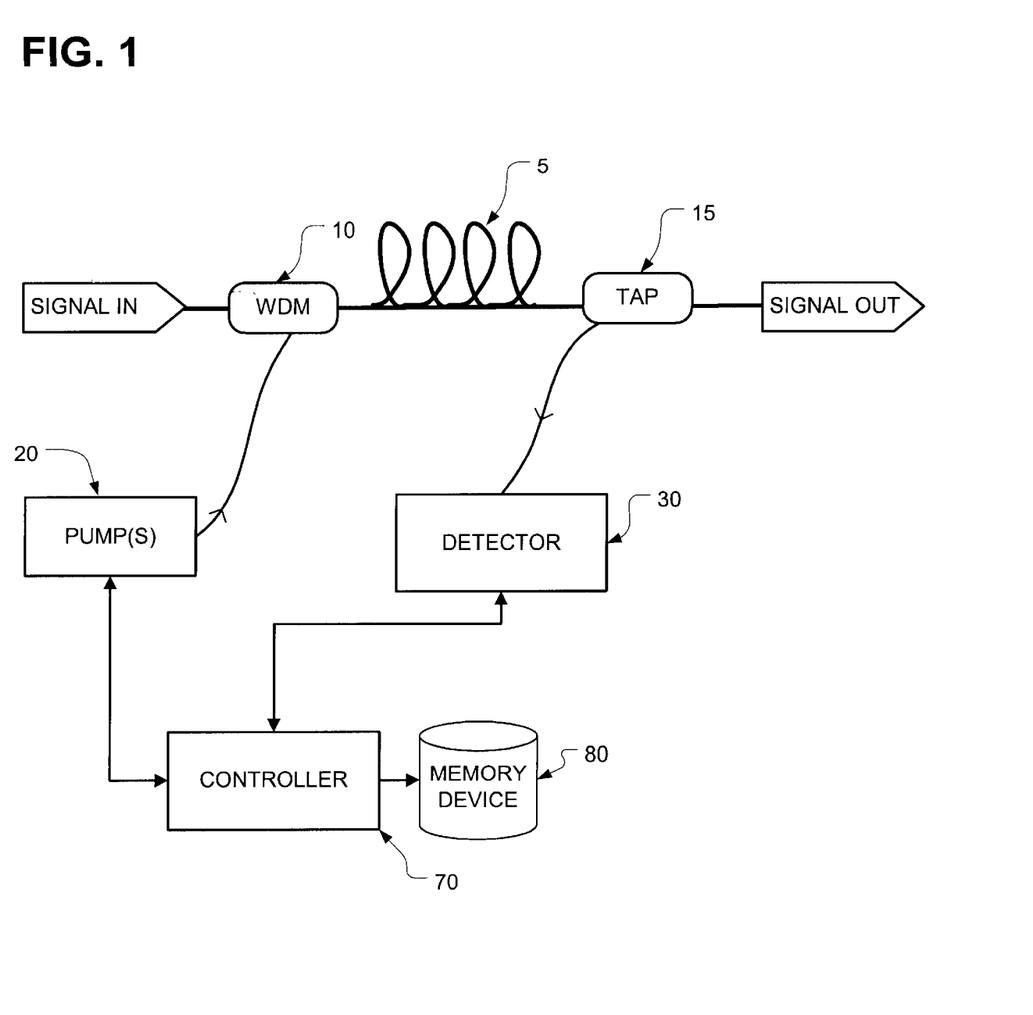
FIG. 1 is a block diagram illustrating components of an optical amplification system according to the invention.

FIG. 1 illustrates an exemplary system according to the invention. A signal (designated by "signal in" and "signal out") propagates in a fiber plant 5, which may include optical fiber, splices, connectors, patch panels, and other network elements.

Pump(s) 20 provide distributed amplification to the signal propagating in fiber plant 5. This distributed amplification may be generated physical interactions such as by stimulated Raman and/or Brillouin scattering as is known in the art. The pump(s) 20 may include a single or multiple pumping lasers operating at one or more pumping wavelengths. Generally speaking, Raman and/or Brillouin amplification may be induced by operating the pump(s) 20 at particular wavelength(s).

Figure 2:
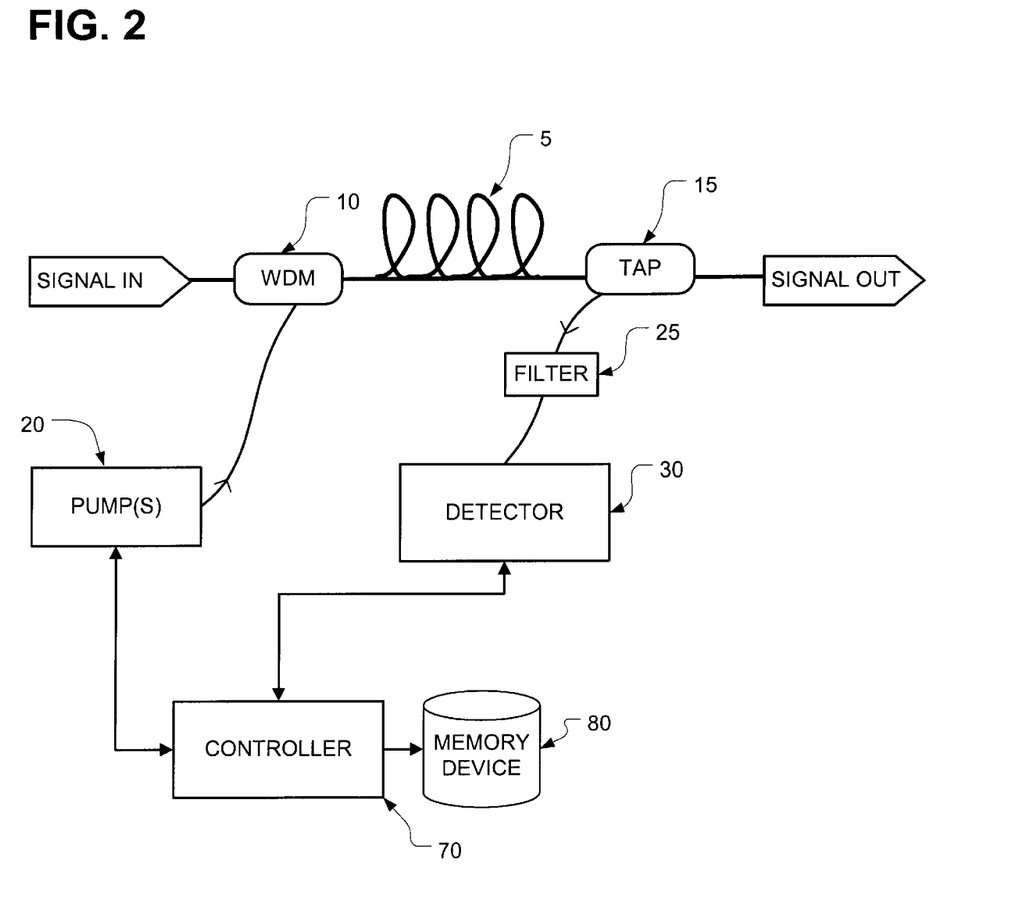
FIG. 2 is a block diagram illustrating components and an alternative filter for an optical amplification system according to the invention.
Figure 3:
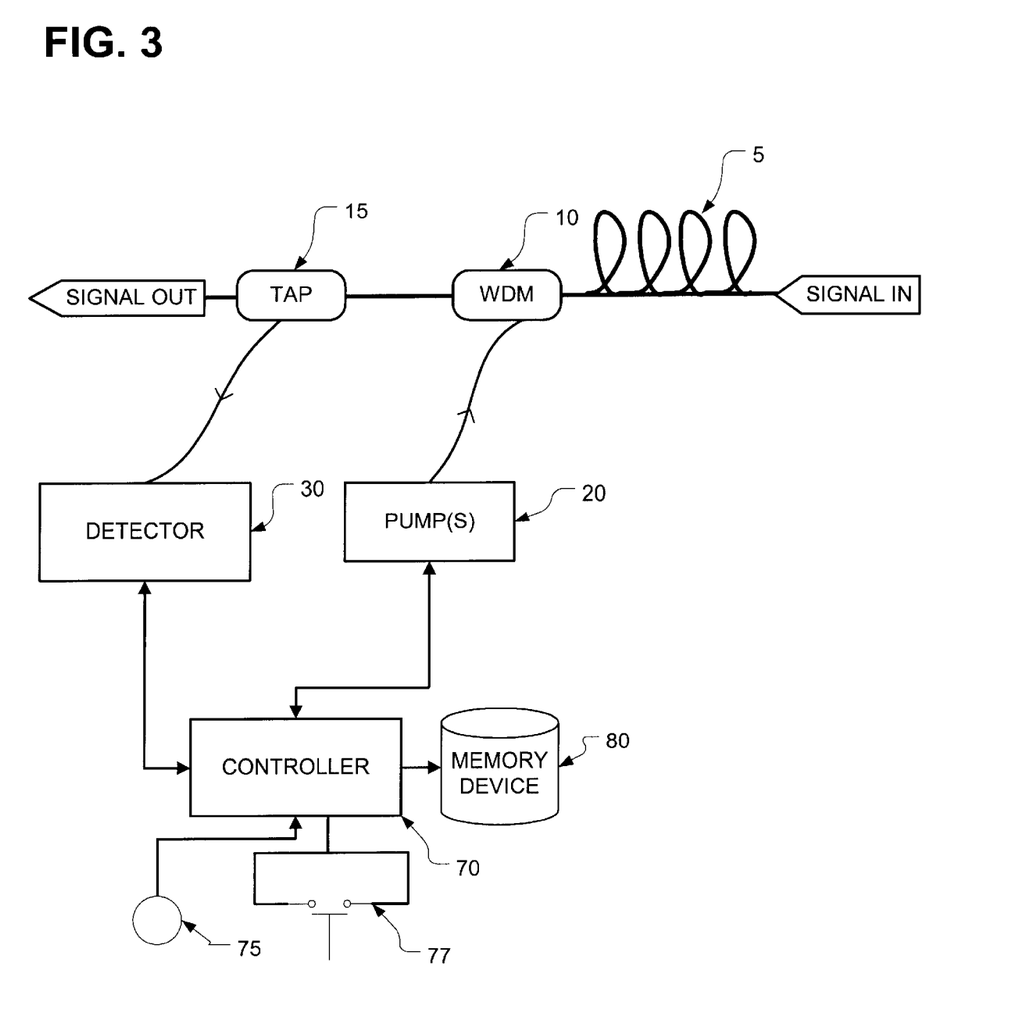
FIG. 3 is a block diagram illustrating components, an alternative input port, and an alternative calibration switch for an optical amplification system according to the invention.

The systems shown in the FIGS. 1 and 2 illustrate copropagating amplification in which the pumping light propagates in the same direction in which the signal light propagates. In FIGS. 1 and 2, the pumping light is injected at the beginning of the span and the tap 15 is at the end of the span. The invention is not limited to copropagating amplification and also includes counterpropagating amplification as shown in FIG. 3 in which the pumping light propagates a direction counter or opposite to the signal propagation direction.

The pump(s) 20 inject pumping light into the fiber plant 5 via wavelength division multiplexer (WDM)10. The WDM 10 is a conventional element that is also referred to as a wavelength selective coupler. WDM 10 may be constructed with various devices to permit the signal light and pumping light to pass transparently therethrough. The pump 20 emits light at a wavelength different than the signal light. The wavelength selective coupler or WDM 10 is frequency or wavelength selective in that it will route the pumping light onto fiber plant 5 and prevent signal light from being fed to the pump 20.

For example, WDM 10 may be a wavelength dimension multiplexer using a Bragg filter or Fabry-Perot interferometer. WDM 10 may also be made from dielectric coatings, a thin-film filter, or arrayed waveguides.

Tap 15 is quite conventional and may be constructed from a variety of conventional elements. Tap 15 is connected "after" the WDM 10 in the direction of the signal light so that it can "see" the amplified signal light amplified by pump 20. Because of accessibility concerns, the tap 15 may be located at the end of a span of fiber plant 5.

In other words, spans of fiber are typically inaccessible because they are located underground, underwater, or otherwise in position that is not readily accessible. The end of a fiber span is typically located in a hut or other serviceable location which makes the installation of a tap 15 convenient. Tap 15 may also be an existing tap such as those that may be provided on another amp such as an EDFA. All that is necessary is that tap 15 provide a portion of the amplified signal light to detector 30. Of course, if the pump 20 is off or not generating pumping light at a level sufficient to induce amplification, then tap 15 will feed a portion of the unamplified signal light to detector 30.

The detector 30 is connected to tap 15 and receives a portion of the signal light from tap 15. Detector 30 may be constructed from a variety of conventional elements such as a photodetector, photodiode, power meter, etc. As more fully described below in relation to FIG. 4, detector detects the signal level of the signal light and sends a signal to controller 70. The units of measurement of the signal level are immaterial to the invention as long as controller 70 can calculate gain from the measurement.

Controller 70 is connected to the detector 30, pump 20 and memory device 80. The term "connection" as used herein is a relative term and does not require a direct physical connection. This is particularly true in relation to the controller 70 which may need to communicate with physically distant components such as the pump 20, detector 30 and memory device 80.

For example, controller 70 may communicate with these elements by using a communication pathway over fiber plant 5 or via an Internet or wireless communication pathway. Such alternative communication pathways may be convenient in view of the physically distinct locations that may be provided for the detector 30, pump 20, controller 70 and memory device 80.

As another example, the detector 30 may be located several kilometers from the pump 20 in order to detect the amplification properties of a long section of fiber plant 5 when using copropagating amplification. Such physical distance may not be convenient for a direct, physical connection between controller 70 and either pump 20 or detector 30. In one construction, the detector 30 may relay measurement results to a physically distant controller 70 over one or more communication pathways. In another construction, the controller 70 may relay control signals to a physically distant pump 20. In yet another construction, detector may relay measurement results to a physically distant controller 70 which may, itself, relay control signals to a physically distant pump 20. In addition, controller 70 may send control signals to detector 30 to control when the measurements are taken or to request transmission of one or more measurements from the detector 30 to controller 70.

Controller 70 may be constructed in a variety of fashions utilizing electronic components, optical components, computer hardware, firmware, software or a combination thereof. Controller 70 may also utilize processing resources of an existing controller such as a network element controller, terminal controller, or network managing controller.

Memory device 80 may also be constructed in a variety of fashions including the on-chip memory of a microprocessor and/or external memory devices. The memory requirements of the invention are rather low and, therefore, the size of the memory device 80 would not have to be very large.

FIG. 2 illustrates an alternative system according to the invention. FIG. 2 is quite similar to FIG. 1, but adds filter 25 which is interposed between tap 15 and detector 30. Filter 25 may be constructed using conventional elements. The purpose of filter 25 is to bandpass the operating wavelengths of the signal light. In a wavelength division multiplexed system, the operating wavelengths may comprise a large number of wavelengths. As explained in more detail below in the operation section, filter 25 aids in the calculation of more accurate fiber plant gain value(s).

FIG. 3 illustrates an alternative system according to the invention. FIG. 3 is quite similar to FIG. 1, but utilizes counterpropagating amplification and adds an input 75 connected to controller 70. Input 75 may transmit a control signal and/or desired gain level to controller 70. A control signal may be used to trigger one or more of the functions performed by controller 70. Although the memory device 80 may store the desired gain level, it is more typical to input the gain level as a command through an input such as input 75. The operation and purpose of input 75 will be further described below in relation to FIG. 4.

FIG. 3 also illustrates a calibration button 77 the output of which is connected to controller 70. Calibration button 77 may be used to send a calibration control signal or command to controller 70 to trigger one or more of the functions performed by controller 75. The operation and purpose of calibration button 77 will be further described below in relation to FIG. 4. The system may operate with none, one or both of the inputs 75 and 77.

In addition, the features of FIGS. 2 and 3 may be combined so that a filter 25 is utilized in conjunction with one or both of the inputs 75 and 77 and wherein either one or both counterpropagating and copropagating amplification are employed.

OPERATION OF INVENTION

In general, the invention operates by measuring the signal level while the pump power is increased and calculating gain for various pump power levels. The invention may also use a single measurement to calculate gain by assuming that zero pump power will produce zero gain. Preferably, at least two measurements should be taken: a first measurement establishes a baseline or reference level and a second measurement establishes a rudimentary gain profile of the amplification occurring in the existing fiber plant 5. If the gain profile is approximately linear, then the measurement(s) may approximately characterize the entire gain profile of the distributed amp.

Even more preferably, however, more than two measurements are taken by detector 30 so that controller 70 can calculate a more accurate gain profile. In other words, measurements preferably are taken at a variety of points while the pump 20 output power is increased over an operating range. The controller 70 then calculates a gain profile or transfer function which may be, for example, gain as a function of pump power (or percent of full pump power). This gain profile may be conveniently stored as a look-up table in memory device 80.

By accessing the look-up table stored in memory device 80 or by utilizing the calculated transfer function, the controller 70 can determine the output power corresponding to a desired amount of gain. The controller 70 can then control pump 20 to provide this output power and thereby produce the desired amount of gain for the signal.

Figure 4:
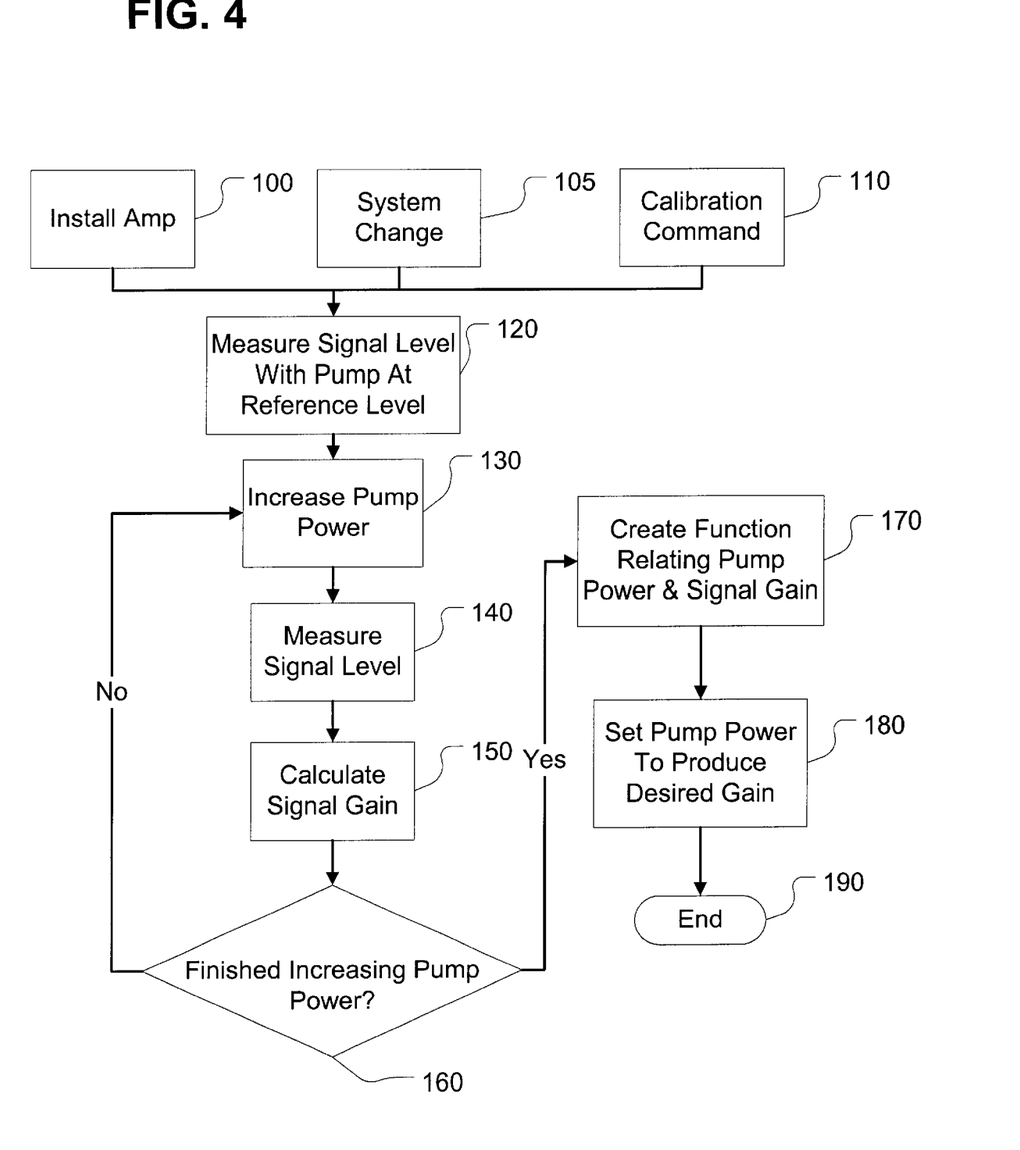
FIG. 4 is a high-level flowchart illustrating a method of controlling gain of a distributed amplifier according to the invention.

FIG. 4 is an example of a control methodology according to the invention. As shown therein, a variety of conditions may trigger the operation of the invention. These conditions include installation of the amplifier (step 100), a system change (step 105) and a calibration command input (step 110).

Installation 100 of the amplifier includes installing a new pump 20, changing the pump 20, adding or changing pumping lasers within the pump 20, changing the operable wavelengths of the pump 20, etc.

A system change 105 includes any change the fiber plant 5 such as adding a network element, installing or adding new optical fiber, rerouting the fiber path, reconfiguration of a patch panel or any other system change that would cause the amplification properties of the fiber plant 5 to change. Notification of a system change may be performed by receiving a signal via input 75 shown in FIG. 3.

A calibration command 110 may be generated by triggering the calibration switch 77 shown in FIG. 3. In other words, the invention contemplates manual commands such as the calibration switch 77, automatic commands such as installation 100 of the amp, and system generated commands such as the input 75 shown in FIG. 3.

Once triggered, the method proceeds by measuring the signal level (step 120). This is an initial, reference or baseline measurement that permits a gain calculation to be performed. This reference measurement may be made with the pump 20 outputting pumping light at a reference level. The reference measurement may be performed by detector 30 which outputs a reference level measurement to controller 70. Incidentally, the reference level measurement is also stored by controller 70 in memory device 80.

The reference level may be zero amplification in which case the pump 20 would be off or otherwise not outputting pumping light. The reference level may also be a low-level output of pumping light from pump 20 such that amplification does not yet occur. The reference level may also be a pump 20 output power sufficient to cause amplification of the signal light.

The pump 20 power is then increased (step 130). This may be performed by the controller 70 commanding the pump 20 to output pumping light at an increased level with respect to the reference pump level set in step 120. Power level increases may be performed step-wise or otherwise in a defined fashion. Subsequent iterations increase output pumping light at an increased level with respect to the previous iteration.

The method may then measure the signal level again (step 140). As mentioned above, only two measurements are necessary including the reference level measurement and at least one measurement while the pump 20 is injecting pumping light sufficient to cause amplification of the signal light. This step may also be performed by detector 30 which outputs a signal level measurement to controller 70. Incidentally, the measurements are also stored by controller 70 in memory device 80.

Step 150 calculates the signal gain. This calculation may be performed by controller 70 which utilizes the stored measurements (reference level and measured level(s) at increased pump 20 power) to calculate gain.

Step 160 then forms a loop by testing whether the method has finished increasing pump 20 power. If no, then the method loops back to step 130 to increase pump power, measure signal level (step 140), and calculate signal gain (step 150).

If controller 70 is finished increasing pump power, then step 170 calculates a transfer function relating pump power and signal gain. The transfer function may be in equation form particularly if the gain curve is linear or is otherwise subject to approximation or analytic expression. Alternatively, the transfer function may in the form of a look-up table stored in memory device 80.

With the transfer function in hand, the controller 70 may then set pump 20 power to produce a desired signal gain (step 180). The desired signal gain value may be internally stored in memory device 80. Preferably, however, an input such as input 75 may be used to input the desired gain level which is then utilized by controller 70 to calculate the pump 20 power level necessary to achieve the desired gain. The method is then finished as indicated by end step 190.

The gain calculation step 150 may be performed in a variety of ways. If the signal propagated in fiber plant 5 has only one wavelength, then the gain, G, calculation is straightforward and may use an equation such as G=Pm/Pref. where Pm is the power level of the signal measured in step 130 and Pref. is the reference power level of the signal measured in step 110. Preferably, the gain is calculated at a plurality of measurement points, i , such that the equation is $G_i = Pm_i/Pref$.

However, if the signal propagated in fiber plant 5 has a plurality of wavelengths such as in a wavelength division multiplexed system, then the signal measurements and gain calculations may be more complex to account for the possibility that the gain is dependent upon wavelength. In this situation, reference signal and amplified signal measurements (steps 120 and 140) may be performed over the operating wavelengths. Furthermore, the controller 70 may use the following equation to calculate such multiwavelength gain $G_i$:

$$G_i = \frac{\sum_{j=1}^{N} Pm_{ij}}{\sum_{j=1}^{N} Pref_j}$$

where $Pm_i$=power level of the signal measured in iteration i-th of step 130,

Pref.=power level of the signal measured in step 110, j=wavelength index which may vary from the lowest to highest wavelength in the operating wavelength range.

In other words, the gain at each measurement point, i, is calculated according to a summation of measured power Pm (summed over the operating wavelengths j) divided by a summation of reference power Pref. (summed over the operating wavelengths j).

If a look-up table is utilized, then memory device 80 will store each $G_i$ and a corresponding output power level (or indictor thereof) of pump 20. The output power may be represented as a scale or percent of available output power to conserve space in memory device 80. Alternatively, the $G_i$ values may be used to calculate a transfer function instead of using a look-up table.

The signal measurements and gain calculations may also be improved by adding filter 25 as shown in FIG. 2 and described above. Filter 25 preferably passes the operating wavelengths and rejects other wavelengths.

Figure 6:
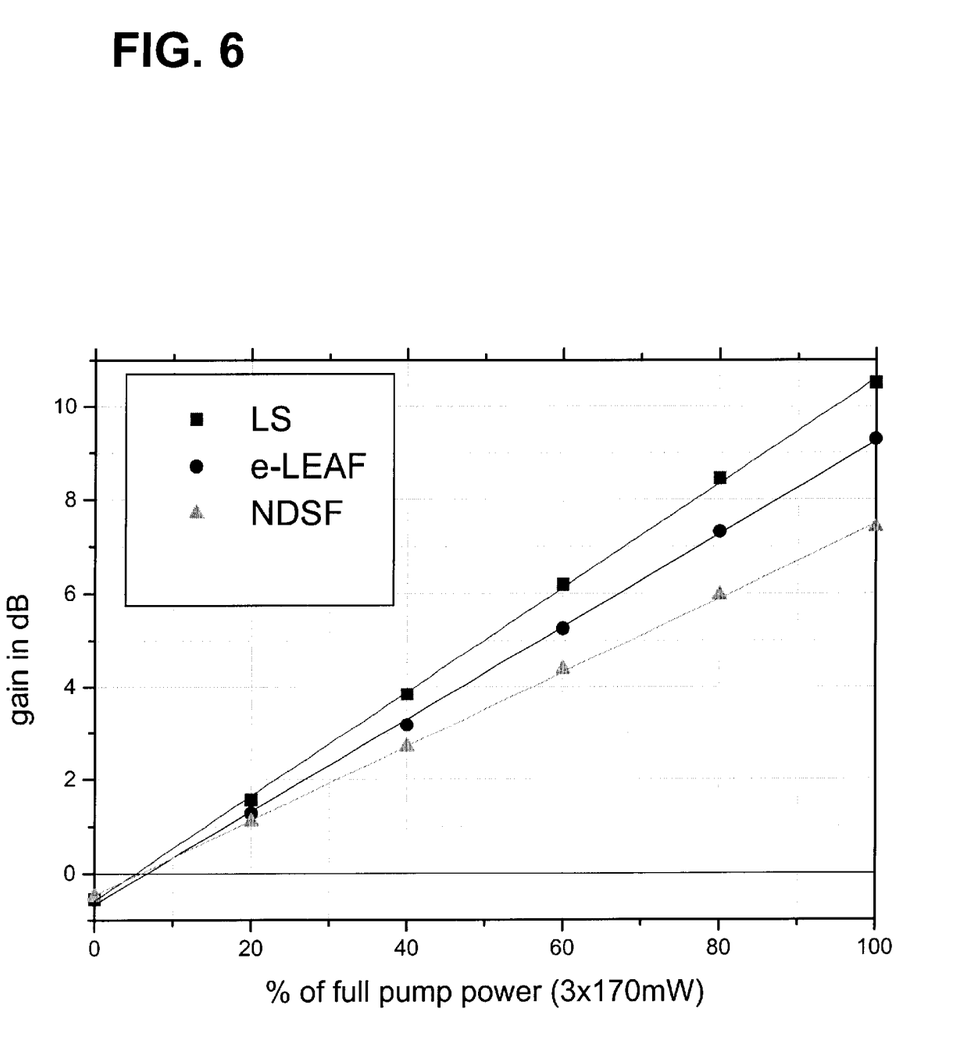
FIG. 6 is an example of a graph of gain versus pump power that is generated by the invention and which may be utilized by the invention in the form of a look-up table to control a distributed amplifier.

FIG. 6 shows exemplary experimental data showing the operation of the invention. In this experiment three different fiber plants 5 are tested. The three different fiber plants 5 include fiber plants with LS, e-LEAF, and NDSF types of optical fiber which are measured as indicated by the square, circle, and triangle data points, respectively. Each of these data points represents a measurement taken in step 140, however, the bottommost measurement point may represent the reference level taken in step 120. The graph of FIG. 6 plots the gain in dB verses percent (%) of full pump power. As such, the graphs of FIG. 6 could be used as a look-up table in step 180 where the desired gain level would be input and the output would be the percent of full pump power necessary to produce the desired gain for the particular fiber plant 5.

As can be seen from the different curves of FIG. 6, the gain profile does vary from one fiber plant to another fiber plant. It is to be understood that the graphs of FIG. 6 are non-limiting examples of the variety of transfer functions and look-up tables that may be generated by the invention.

Figure 5:
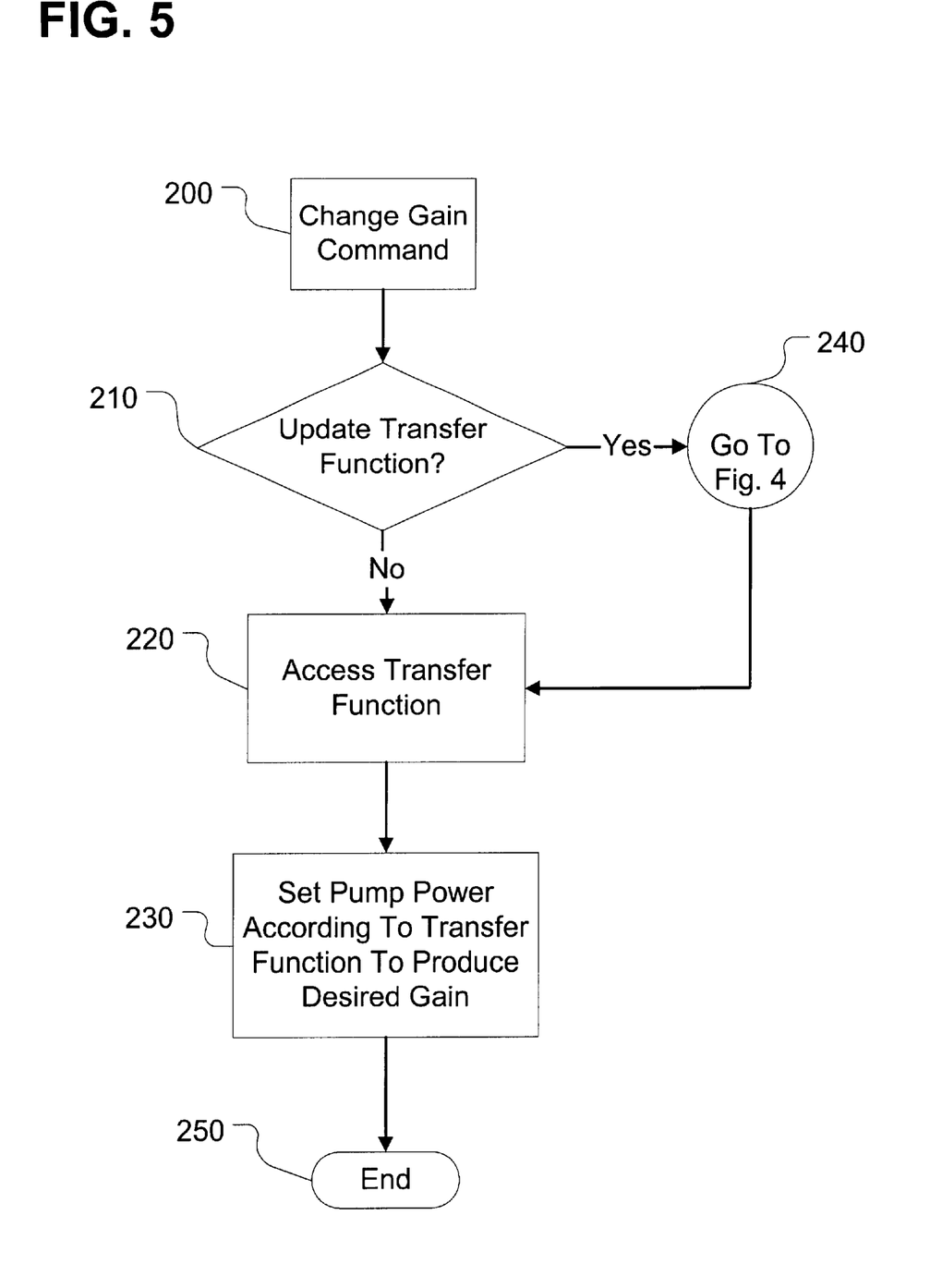
FIG. 5 is a high-level flowchart illustrating another method of controlling gain of a distributed amplifier according to the invention.

FIG. 5 illustrates another method according to the invention. FIG. 5 is intended to operate whenever the gain of the distributed amplifier needs to be changed. Upon receiving a change gain command (step 200) via input 75 or otherwise determining that the gain should be changed, the method then determines whether the transfer function should be updated (step 210). This may be determined by determining when the transfer function was generated. If the transfer function is older than a threshold age or if the system has been updated since the transfer function was generated, then an updated transfer function should be generated (step 240) by utilizing the method of FIG. 4.

As further shown in FIG. 5, the method then accesses the transfer function (step 220). The controller 70 may then set the pump power according to the transfer function to produce the desired new gain level (step 230). The method is then complete as indicated by end step 250.

It is to be understood that the order of the steps shown in FIGS. 4 and 5 is not required for the invention to operate properly and that other sequences and flows may be utilized in an equivalent fashion to accomplish the objects of the invention.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

I claim:

1. A method of providing distributed Raman amplification having a desired Raman gain for a signal travelling in a fiber plant, comprising:

increasing an output power of an optical pump operatively connected to the fiber plant and operable at a wavelength selected to provide distributed Raman gain to the signal travelling in the fiber plant;

measuring a signal level of the signal travelling in the fiber plant at an increased output power of the optical pump increased by said increasing step;

calculating a function relating the output power of the optical pump and the signal gain of the signal travelling in the fiber plant;

storing the function calculated by said calculating step relating the output power of the optical pump and the signal gain of the signal travelling in the fiber plant; and controlling the output power of the optical pump according to the stored function to provide the desired Raman gain.

2. The method of providing distributed amplification having a desired Raman gain for a signal travelling in a fiber plant according to claim 1, further comprising:

inputting the desired Raman gain;

said controlling step controlling the output power of the optical pump according to the stored function to provide the desired Raman gain input by said inputting step.

3. The method of providing distributed amplification having a desired Raman gain for a signal travelling in a fiber plant according to claim 1, wherein the function calculated by said calculating step is a look-up table, said calculating step constructing the look-up table relating the output power of the optical pump and the signal gain of the signal travelling in the fiber plant; and said controlling step accessing the stored look-up table to determine the output power corresponding to the desired Raman gain.

4. The method of providing distributed amplification having a desired Raman gain for a signal travelling in a fiber plant according to claim 1, wherein the method is executed when the optical pump is installed in the fiber plant.

5. The method of providing distributed amplification having a desired Raman gain for a signal travelling in a fiber plant according to claim 1, wherein the method is executed when the fiber plant changes.

6. The method of providing distributed amplification having a desired Raman gain for a signal travelling in a fiber plant according to claim 1, wherein the method is executed upon receiving a calibration command.

7. The method of providing distributed amplification having a desired Raman gain for a signal travelling in a fiber plant according to claim 1, said measuring a signal level step measuring the signal level when the optical pump is pumping the fiber plant at two different levels to establish a reference signal level and a signal gain level; and said calculating step calculating the signal gain of the signal travelling in the fiber plant according to the reference signal level and the signal gain level.

8. The method of providing distributed amplification having a desired Raman gain for a signal travelling in a fiber plant according to claim 1, said measuring a signal level step measuring the signal level when the optical pump is pumping the fiber plant at a plurality of different levels to establish a reference signal level and a plurality of signal gain levels; and said calculating step calculating the signal gain of the signal travelling in the fiber plant according to the reference signal level and the signal gain levels.

9. The method of providing distributed amplification having a desired Raman gain for a signal travelling in a fiber plant according to claim 8, said measuring a signal level step measuring the signal level when the optical pump is not providing gain to the signal to establish the reference signal level.

10. The method of providing distributed amplification having a desired Raman gain for a signal travelling in a fiber plant according to claim 1, wherein the signal travelling in the fiber plant includes a plurality of wavelengths, said measuring a signal level step measuring a filtered signal level of the signal travelling in the fiber plant as the output power of the optical pump is increased by said increasing step, wherein the filtered signal level includes the plurality of wavelengths of the signal; and said calculating step calculating the signal gain by summing signal gain over the plurality of wavelengths.

11. An apparatus for controlling an optical pump to provide a desired Raman gain for a signal travelling in a fiber plant, comprising:

a detector operatively connected to the fiber plant, a controller operatively connected to said detector and to the optical pump, a memory device operatively connected to said controller;

said controller controlling the optical pump to increase output power of pumping light injected into the fiber plant;

said detector detecting a signal level of the signal travelling in the fiber plant at an increased output power of the optical pump increased by said controller;

said controller receiving the signal level from said detector;

said controller constructing a transfer function relating the output power of the optical pump and a signal gain of the signal travelling in the fiber plant; and said controller controlling the output power of the optical pump according to the transfer function to provide the desired Raman gain.

12. The apparatus for controlling an optical pump to provide a desired Raman gain for a signal travelling in a fiber plant according to claim 11, further comprising:

an input port operatively connected to said controller;

said input port receiving a desired Raman gain value;

said controller controlling the output power of the optical pump according to the transfer function stored in said memory device and the received desired Raman gain value.

13. The apparatus for controlling an optical pump to provide a desired Raman gain for a signal travelling in a fiber plant according to claim 11, wherein the transfer function constructed by said controller is a look-up table, said controller constructing the look-up table relating the output power of the optical pump and the signal gain of the signal travelling in the fiber plant; and said controller accessing the look-up table stored in said memory device to determine the output power corresponding to the desired Raman gain.

14. The apparatus for controlling an optical pump to provide a desired Raman gain for a signal travelling in a fiber plant according to claim 11, further comprising:

a calibration command input operatively connected to said controller, said calibration command input receiving a calibration command and sending the calibration command to said controller;

said controller constructing the transfer function and controlling the output power of the optical pump according to the transfer function to provide the desired Raman gain upon receiving the calibration command from said calibration command input.

15. The apparatus for controlling an optical pump to provide a desired Raman gain for a signal travelling in a fiber plant according to claim 11, further comprising:

said detector detecting the signal level when the optical pump is pumping the fiber plant at two different output powers of the pumping light being injected into the fiber plant by the optical pump to establish a reference signal level and a signal gain level; and said controller calculating the signal gain of the signal travelling in the fiber plant according to the reference signal level and the signal gain level.

16. The apparatus for controlling an optical pump to provide a desired Raman gain for a signal travelling in a fiber plant according to claim 11, further comprising:

said detector detecting the signal level when the optical pump is pumping the fiber plant at a plurality of different output powers of the pumping light being injected into the fiber plant by the optical pump to establish a reference signal level and a plurality of signal gain levels; and said controller calculating the signal gain of the signal travelling in the fiber plant according to the reference signal level and the signal gain levels.

17. The apparatus for controlling an optical pump to provide a desired Raman gain for a signal travelling in a fiber plant according to claim 11, further comprising:

said detector detecting the signal level when the optical pump is not providing gain to the signal to establish the reference signal level.

18. The apparatus for controlling an optical pump to provide a desired Raman gain for a signal travelling in a fiber plant according to claim 11, wherein the fiber plant includes optical fiber and optical components.

19. The apparatus for controlling an optical pump to provide a desired Raman gain for a signal travelling in a fiber plant according to claim 11, wherein the signal travelling in the fiber plant includes a plurality of wavelengths, the apparatus further comprising:

a filter operatively connected to said detector and to the fiber plant, said filter filtering out wavelengths outside an operating wavelength range of the signal;

said detector detecting a filtered signal level of the signal travelling in the fiber plant at an increased output power of the optical pump increased by said controller;

said controller determining the signal gain by summing signal gain over the plurality of wavelengths.

20. A method of providing distributed Raman amplification having a desired Raman gain for a wavelength division multiplexed signal having a pluarlity of wavelengths travelling in a fiber plant, comprising:

increasing an output power of an optical pump operatively connected to the fiber plant and operable at a wavelength selected to provide distributed Raman gain to the wavelength division multiplexed signal travelling in the fiber plant;

measuring a filtered signal level of the wavelength division multiplexed signal travelling in the fiber plant as the output power of the optical pump is increased by said increasing step, wherein the filtered signal level includes the plurality of wavelengths of the signal;

calculating a function relating the output power of the optical pump and the signal gain of the wavelength division multiplexed signal travelling in the fiber plant based on the filtered signal level measured by said measuring step;

storing the function calculated by said calculating step relating the output power of the optical pump and the signal gain of the wavelength division multiplexed signal travelling in the fiber plant;

inputting the desired Raman gain; and controlling the output power of the optical pump according to the stored function to provide the desired Raman gain input by said inputting step.

21. The method of providing distributed amplification having a desired Raman gain for a signal travelling in a fiber plant according to claim 20, said controller utilizing a multiwavelength gain $G_i$ as the signal gain, said controller calculating a multiwavelength gain $G_i$ according to $$G_i = \frac{\sum_{j=1}^{N} Pm_{ij}}{\sum_{j=1}^{N} Pref_j}$$

where $Pm_i$=power level of the wavelength division multiplexed signal measured in an i-th iteration of said measuring step, Pref.=power level of the wavelength division multiplexed signal measured when the output power of the optical pump is at a reference level, and j=a wavelength index which varies from a lowest to a highest wavelength in an operating wavelength range of the wavelength division multiplexed signal.

* * * * *